Feb. 6, 1962 I. NADLER 3,019,548
SOAP GRIP HOLDERS
Filed April 10, 1959

INVENTOR.
IRA NADLER
BY
*Zolton H. Holochek*
ATTORNEY

United States Patent Office 3,019,548
Patented Feb. 6, 1962

3,019,548
SOAP GRIP HOLDERS
Ira Nadler, 575 West End Ave., New York, N.Y.
Filed Apr. 10, 1959, Ser. No. 805,457
1 Claim. (Cl. 45—28)

This invention relates to new and useful improvements in an attachment for a cake of soap in the form of a grip or holder so that the soap cannot escape from the hand of the user when being used.

Another object of the invention is to provide a soap attachment or holder of this character which may be easily and quickly attached to a bar or cake of soap at one side thereof while exposing the remaining portion of the soap for use and which at the same time is neat and attractive for the purposes for which same is intended.

Another object of the invention is to provide an attachment for a cake of soap with a roughened outer surface for use as a scrubber and to prevent sliding and slipping of the cake of soap on a supporting surface or out of the hand of the user.

Another object, according to a modified form of the invention, is to provide an attachment or holder of this character with means for draining excess liquid from the cake of soap.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
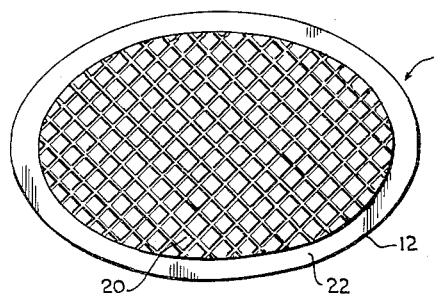
FIG. 1 is a top plan view of a soap grip or holder embodying one form of the invention.
Figure 2:
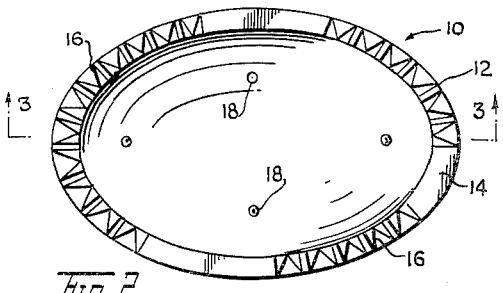
FIG. 2 is a bottom plan view thereof.
Figure 3:
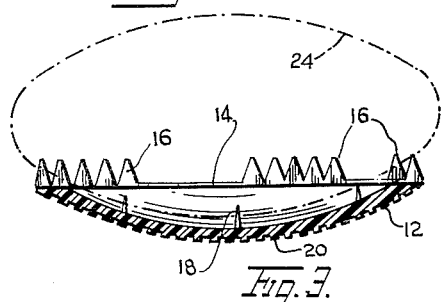
FIG. 3 is a horizontally sectional view taken on the plane of the line 3—3 of FIG. 2, the grip being shown embedded in a cake of soap, the soap being shown in dot-dash lines.

Referring in detail to the drawings, in FIGS. 1–3, the preferred form of the soap grip or holder is shown and designated by the reference numeral 10. The soap grip or holder 10 is formed as a plastic shell by a suitable molding process. The shell may be white or colored. The plastic material should be such as to resist the action of hot water and to resist the action of alkali such as is commonly used in soaps. It should be chemically and physically stable in the wet, alkaline environment in which soap is used. A most suitable plastic for this purpose is melamine formaldehyde. Glass reinforced polyesters and other materials are also suitable for this purpose.

The grip or holder comprises a body 12, oval-shaped in plan, and slightly dished or curved with a flat peripheral edge 14 facing upwardly as viewed in FIG. 3. At spaced intervals along the peripheral edge, groups of spaced teeth 16 project outwardly. A plurality of spaced barbs 18, four being shown, project outwardly from the inner surface of the body to a point inwardly of the plane of the peripheral edge. The outer surface of the body is scored or knurled to provide a roughened surface as indicated at 20. A plain margin 22 remains adjacent the peripheral edge of the body.

In use, the grip or holder 10 is placed on the wide surface area of a cake of soap 24 such as shown in FIG. 3 and the grip pressed inwardly embedding the peripheral teeth 16 in the soap and piercing the soap with the tips of the barbs 18 so that the body 12 of the grip projects outwardly only slightly and conforms to the shape of the outer surface of the cake of soap. The grip fits readily into the palm of the hand of the user. The roughened surface of the grip prevents the cake of soap from slipping out of the hand, and from slipping on a horizontal supporting surface.

Figure 4:
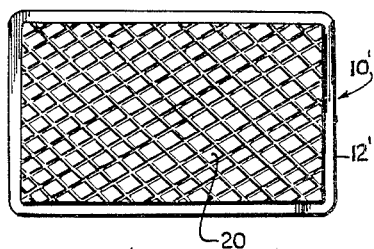
FIG. 4 is a top plan view of a soap grip embodying a modification of the invention.
Figure 5:
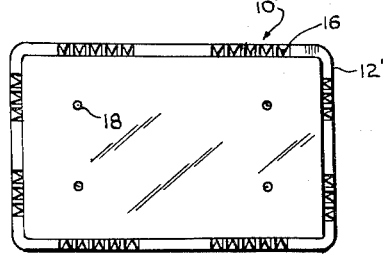
FIG. 5 is a bottom plan view thereof.
Figure 6:
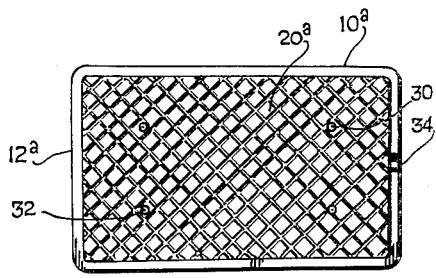
FIG. 6 is a top plan view of a soap grip embodying another modification of the invention.
Figure 7:
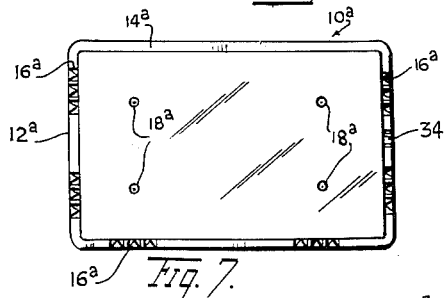
FIG. 7 is a bottom plan view thereof.

The modified form of soap grip of holder 10' shown in FIGS. 4 and 5 differs from the form of grip 10 only in that the shape of the body 12' is rectangular instead of oval. Otherwise the body is dished and of the same construction as grip 10.

Referring now to the modification of the invention shown in FIGS. 6 to 9, inclusive, the grip or holder 10a shown herein has a rectangular-shaped dished body 12a with groups of teeth 16a spaced along its peripheral edge 14a. Barbs 18a project from the inner surface of the body. In this form of the invention, however, a pair of spaced pointed studs serving as legs 30 project from the outer roughened surface 20a at one end thereof, and a pair of similar studs serving as legs 32 project from the outer surface at the other end thereof, legs 32 being longer than the legs 30. Furthermore, in this form the peripheral ledge 14a at one end of the body, the end mounting the short legs 30, is formed with a slot or notch 34 communicating with the dished interior of the body.

Figure 8:
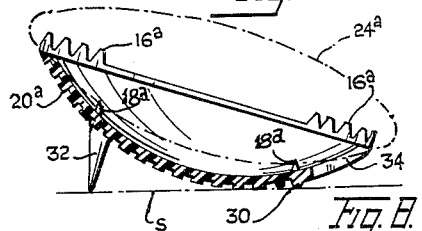
FIG. 8 is a horizontal sectional view taken along the longitudinal center of FIG. 7, showing a cake of soap in dot-dash lines in supported condition thereon.
Figure 9:
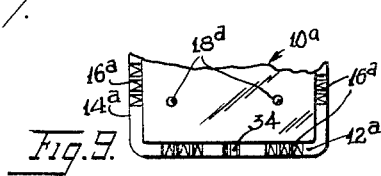
FIG. 9 is a fragmentary end view of the right-hand end of FIG. 7.

This construction and arrangement of legs and slot permits the grip or holder to rest on a horizontal supporting surface S as shown in FIG. 8, with the notched end of the grip lower than the other end so that the excess liquid from the cake of soap 24a drains out through the slot or notch 34.

A soap grip holder may be made according to this invention with personalized initials in any desired color combinations and the shapes of the grip holders may be varied to simulate animals, human figures or other objects.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A soap grip comprising a rigid plastic dish-like shell body, rectangular in plan, with spaced groups of projecting teeth spaced along the peripheral edge of the body, and at least four spaced barbs projecting from the inner surface of the dished body, a pair of spaced pointed lugs serving as legs projecting from the outer surface of the body adjacent one end thereof, and another pair of spaced pointed lugs serving as legs projecting from the outer surface of the body adjacent the other end thereof, said latter legs being longer than the first-named legs whereby the body is adapted to be supported in tilted condition, the peripheral edge of the body having a notch communicating with the interior of the body at the center of the end of the body mounting the shorter legs wherethrough excess liquid off of the supported cake of soap is adapted to drain.

References Cited in the file of this patent

UNITED STATES PATENTS 2,366,421    Nelson _____ Jan. 2, 1945

FOREIGN PATENTS

| | | |
|---|---|---|
| 262,934 | Great Britain | Dec. 23, 1926 |
| 299,899 | Italy | Aug. 20, 1932 |
| 449,785 | Italy | June 30, 1949 |
| 660,803 | England | Nov. 14, 1951 |